(12) United States Patent
Tachibana

(10) Patent No.: US 11,890,995 B2
(45) Date of Patent: Feb. 6, 2024

(54) BRACKET FOR VEHICLE MOUNT CAMERA

(71) Applicant: NIFCO INC., Yokosuka (JP)

(72) Inventor: Norihide Tachibana, Yokosuka (JP)

(73) Assignee: NIFCO INC., Yokosuka (JP)

( * ) Notice: Subject to any disclaimer, the term of this patent is extended or adjusted under 35 U.S.C. 154(b) by 375 days.

(21) Appl. No.: 17/416,729

(22) PCT Filed: Jan. 27, 2020

(86) PCT No.: PCT/JP2020/002687
§ 371 (c)(1),
(2) Date: Jun. 21, 2021

(87) PCT Pub. No.: WO2020/162244
PCT Pub. Date: Aug. 13, 2020

(65) Prior Publication Data
US 2022/0041117 A1    Feb. 10, 2022

(30) Foreign Application Priority Data

Feb. 8, 2019 (JP) .................................. 2019-021177

(51) Int. Cl.
*B60R 11/04* (2006.01)
*B60R 11/00* (2006.01)

(52) U.S. Cl.
CPC ....... *B60R 11/04* (2013.01); *B60R 2011/0026* (2013.01)

(58) Field of Classification Search
CPC ...... G03B 17/55; G03B 17/561; H04N 7/183; B60R 2011/0026; B60R 11/04
See application file for complete search history.

(56) References Cited

U.S. PATENT DOCUMENTS 10,459,319 B2    10/2019  Kasai et al.
2016/0216595 A1    7/2016  Carlson
(Continued)

FOREIGN PATENT DOCUMENTS

JP    2015020695 A  *  2/2015  ............ B60R 11/04
JP    2016-190616 A    11/2016
(Continued)

OTHER PUBLICATIONS

PCT/ISA/210, "International Search Report for International Application No. PCT/JP2020/002687," dated Feb. 25, 2020.

*Primary Examiner* — Christopher E Mahoney
(74) *Attorney, Agent, or Firm* — Manabu Kanesaka

(57) ABSTRACT

A bracket includes an abutment portion for a front end portion of a vehicle mount camera, first support portions located at a rear side than the abutment portion to receive first supported portions provided at the vehicle mount camera from a rear side, and second support portions located at right and left at a rear side than the first support portions, for receiving therebetween a rear end portion of the vehicle mount camera. The left and right second support portions respectively include elastic engagement pieces, the elastic engagement piece permitting, by elastic deformation, an upward movement operation of a rear end portion of the vehicle mount camera at a first supported portion as fulcrum from a state that the first support portion receives the first supported portion, and engaging a second supported portion provided in the vehicle mount camera by elastic returning at a finish position of the upward movement.

5 Claims, 7 Drawing Sheets

(56) References Cited

U.S. PATENT DOCUMENTS

| | | | |
|---|---|---|---|
| 2017/0274834 A1* | 9/2017 | Kasai | G03B 17/561 |
| 2018/0239223 A1 | 8/2018 | Blake, III et al. | |
| 2019/0315289 A1* | 10/2019 | Okuda | B60R 11/04 |
| 2022/0050363 A1* | 2/2022 | Tachibana | G03B 17/561 |

FOREIGN PATENT DOCUMENTS

| | | | | |
|---|---|---|---|---|
| JP | 2017-171164 A | | 9/2017 | |
| KR | 20150066770 A | * | 6/2015 | G03B 17/561 |

* cited by examiner

BRACKET FOR VEHICLE MOUNT CAMERA

FIELD OF THE INVENTION

The present invention relates to an improvement of a bracket used for attaching a vehicle mount camera to a window glass.

BACKGROUND OF THE INVENTION

There is a patent document 1 as a bracket for attaching, to a front window, a vehicle mount camera for taking an outside image through the front window of a vehicle. The bracket includes an upper face made as an attaching portion adhered to a face at the front glass inside the vehicle, a hole portion at a front side for receiving a claw portion formed at a front side of the vehicle mount camera, at a rear side, an engaging portion relative to an engaging projection formed at the rear end of the vehicle mount camera, and a plate spring sandwiching the engaging projection together with the engaging portion. In this bracket, the engaging projection is pushed between the engaging portion and the plate spring from a state that the claw portion formed at the front end of the vehicle mount camera is received to the hole portion of the bracket from a rear side, so that the vehicle mount camera is assembled with the bracket in a state that the plate spring is elastically deformed.

PRIOR ART DOCUMENT

Patent Document 1: Japanese Patent Publication No. 2017-171164

SUMMARY OF THE INVENTION

Problem to be Solved by the Invention

In the bracket disclosed in the Patent Document 1, since the plate spring urges the engagement projection of the vehicle mount camera downwardly, wobbling of the vehicle mount camera in an up-down direction is prevented, but wobbling of the vehicle mount camera in a left-right direction can not be prevented. Also, in the bracket disclosed in the Patent Document 1, in assembling the vehicle mount camera with the bracket, it is required that while the vehicle mount camera is positioned such that the claw portion of the vehicle mount camera aligns with the hole portion of the bracket, the assembly operation must be made. Also, since the bracket is made by a bracket main body and the plate spring formed separately, the number of the parts is not minimized.

The main subject to be solved by the present invention is to provide a bracket for the vehicle mount camera, wherein in a condition assembling the vehicle mount camera with the bracket, a structure to properly prevent wobbling in the up-down direction and the left-right direction of the vehicle mount camera is provided, it is required to consider a location adjustment as little as possible in the assembly operation of the vehicle mount camera with the bracket, and further the number of the parts of the bracket is practically minimized.

Means to Solve the Problem

In order to solve the problem, in the present invention, a bracket for attaching to a window glass, a vehicle mount camera for taking an image outside a vehicle through the window glass, comprises:

a base portion fixed to an inside face of the window glass, an abutment portion for a front end portion of the vehicle mount camera, first support portions located at a rear side than the abutment portion configured to receive first supported portions provided on the vehicle mount camera from a rear side, second support portions located on left and right at a rear side than the first support portions, for receiving therebetween a rear end portion of the vehicle mount camera, and elastic engagement pieces respectively provided in the left and right second support portions, the elastic engagement piece permitting, by elastic deformation thereof, an upward movement operation of a rear end portion of the vehicle mount camera at a first supported portion as a fulcrum from a state that the first support portion receives the first supported portion, and engaging a second supported portion provided on the vehicle mount camera by elastic returning at a finish position of the upward movement operation.

In the above structure, when the vehicle mount camera is slid-operated until the front end portion of the vehicle mount camera abuts against the abutment portion, the first supported portions are received in the first support portion from the rear side. Accordingly, the special attention is not required for adjustment in attaching the vehicle mount camera to the bracket.

Also, since the second support portions include the elastic engagement pieces, respectively, by the upward movement operation of the rear end portion of the vehicle mount camera at a first supported portion as a fulcrum from a state that the first support portion receives the first supported portion, the vehicle mount camera can be held in the bracket in a condition that wobbling of the camera in the up-down direction is reduced as little as possible and in a condition that wobbling of the camera in the left-right direction is reduced as little as possible.

In another aspect of the invention, the elastic engagement piece includes an engagement portion regulating a downward movement of the second supported portion in the engagement condition, and a free end regulating a left-right movement of the vehicle mount camera by being pushed to the second supported portion at an upper side of the engagement portion.

In a further aspect of the invention, the bracket is an injection molded product, wherein the base portion integrally includes the abutment portion, the first support portion and the second support portion.

Advantages of the Invention

In the present invention, first, in a state that the vehicle mount camera is fixed to the bracket for the vehicle mount camera, it is possible to rationally and properly provide a structure wherein wobbling of the vehicle mount camera in the up-down direction and in the left-right direction can be prevented as little as possible. Second, it is possible not to consider significantly a positional adjustment in assembling the vehicle mount camera to the bracket. Also, third, it is possible to rationally minimize the number of the parts of the bracket.

EMBODIMENT OF THE INVENTION

Herein after, a typical embodiment of the invention is explained with reference to FIGS. 1-9. A bracket 3 of the embodiment is used to attach a vehicle mount camera 2 for taking an outside image through a window glass to the window glass. Typically, the bracket 3 is used to attach the vehicle mount camera 2 for taking the outside image through the window glass 1 of the vehicle to the window glass 1. Incidentally, the concept of the vehicle mount camera in the specification includes not only a camera in a narrow meaning but including a publicly known device such as a sensor receiving optical information.

Figure 5:
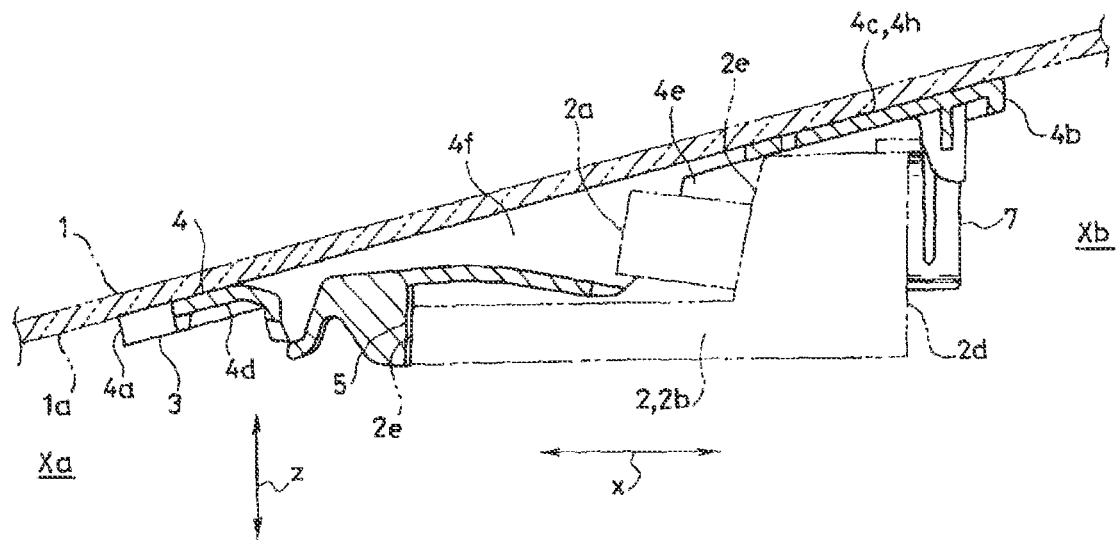
FIG. 5 is a cross-sectional view taken along the line A-A in FIG. 7 showing that the bracket is fixed to the window glass, wherein a condition of assembling the camera with the bracket is shown where the camera is indicated in an imaginary line.

In FIG. 5, numeral 1 is a front window, numeral 3 is a bracket, and numeral 2 is a vehicle mount camera. A front-back direction of the vehicle is indicated by x in FIGS. 1 and 5, a front side of the vehicle is indicated by xa in FIGS. 1 and 5, and a rear side of the vehicle is indicated by xb in FIGS. 1 and 5, respectively. Also, a left-right direction of the vehicle is indicated by y in FIG. 8.

The front window 1 has an inclination where the front side xa of the vehicle is a lower side of the inclination. The bracket 3 is fixed to a face 1a in the vehicle inner side of the front window 1.

In the embodiment of the invention, from a state that the bracket 3 is fixed to the front window 1, with respect to the bracket, the vehicle mount camera 2 is sild from the vehicle rear side xb to the vehicle front side xa until a predetermined location, and thereafter, by moving a rear end 2d of the vehicle mount camera 2 upwardly to the predetermined location, the vehicle mount camera 2 is fixed to the bracket 3.

In the illustrated embodiment, the vehicle mount camera 2 is fixed to the front widow 1 through the bracket 3 such that a light receiving portion 2a for taking an image faces a front side xa.

In the illustrated embodiment, a camera main body 2b includes a step 2e facing the front side xa of the vehicle between a front end portion 2c and a rear end portion 2d, and is provided with the light receiving portion 2a in the step 2e. The camera main body 2b has a size in the up-down direction z between the front end portion 2c and the step 2e (see FIGS. 1 and 5) made small, and a size large in the up-down direction z between the step 2e and the rear end portion 2d.

Figure 3:
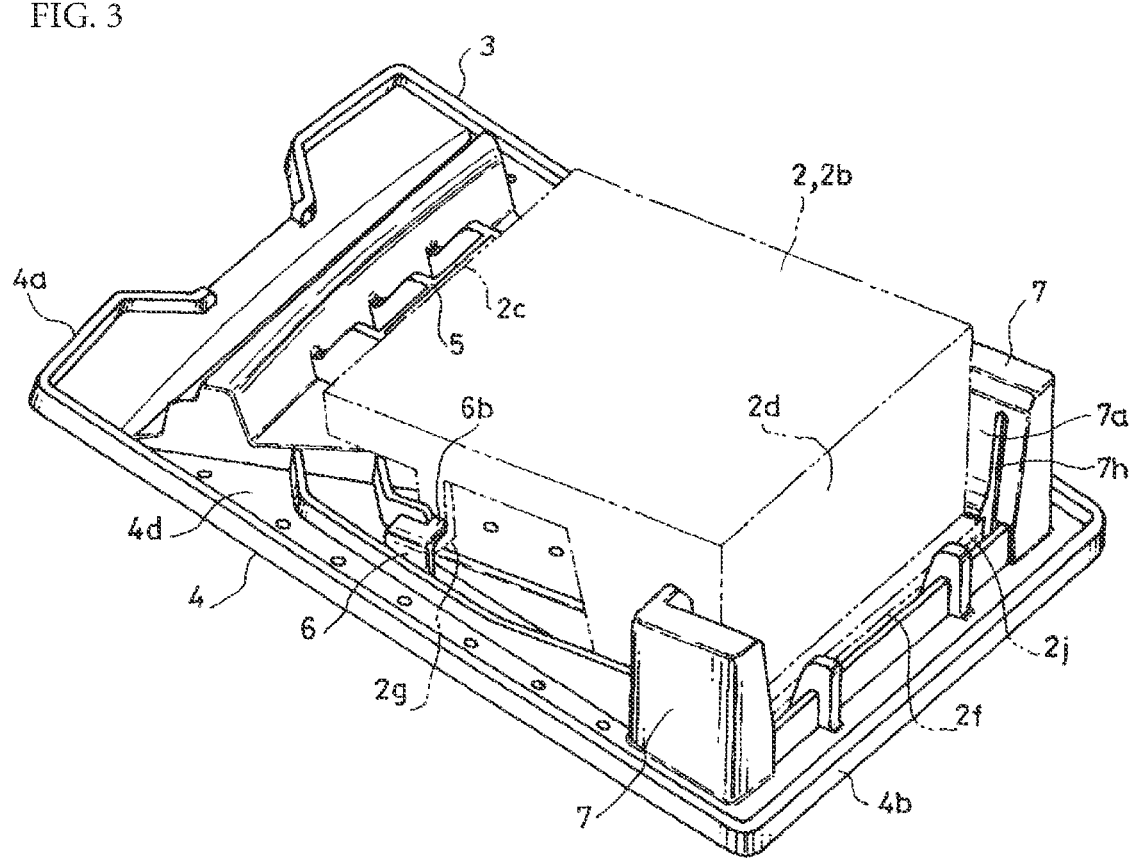
FIG. 3 is a perspective view of the bracket from a lower side, wherein the vehicle mount camera assembled with the bracket is indicated in an imaginary line.
Figure 4:
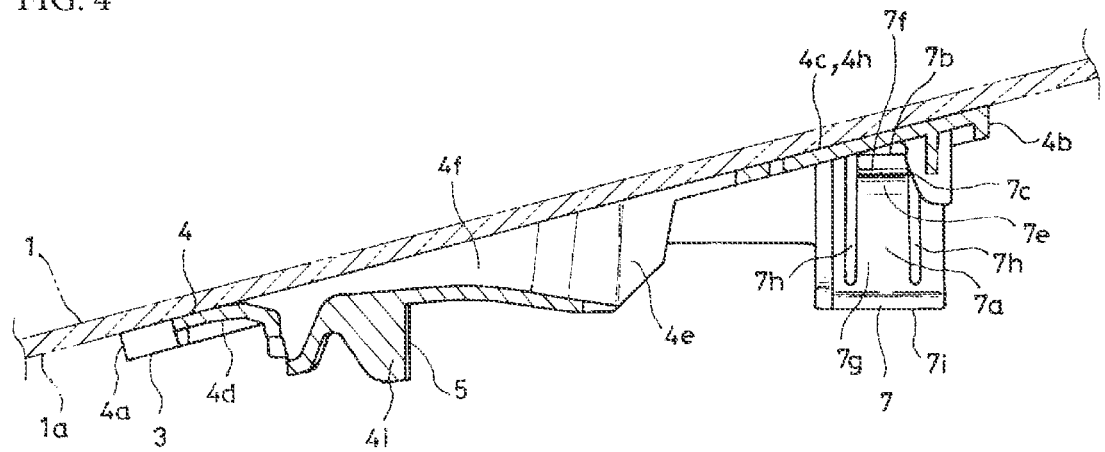
FIG. 4 is a cross-sectional view taken along a line A-A in FIG. 7 showing that the bracket is fixed to the window glass.

The bracket 3 comprises a base portion 4 fixed to an inside face 1a of the front window 1 as a window glass,
  an abutment portion 5 against the front end portion 2c of the vehicle mount camera 2,
  first support portions 6 located at a rear side than the abutment portion 5, in the illustrated embodiment, at the rear side xb of the vehicle, for receiving the first supported portion 2g provided at the vehicle mount camera 2 from a rear side, and
  second support portions 7 located at right and left at a rear side than the first support portion 6, in the illustrated embodiment at the rear end side xb of the vehicle, for receiving therebetween the rear end portion 2d of the vehicle mount camera 2 (see FIG. 3).

The bracket 3 includes an elastic holding piece 7a in each of the left and right second support portions 7, each elastic engagement piece 7a permitting, by an elastic deformation, a sliding operation of the rear end portion 2d of the vehicle mount camera 2 upwardly at the first supported portion 2g as a furculum from a state that the first supported portion 2g is received in the first support portion 6, and engaging a second supported portion 2j provided at the vehicle mount camera by returning elasticity in the end of the sliding operation.

In the above structure, when the sliding operation is made to the vehicle mount camera 2 until a location that the front end 2c of the vehicle mount camera 2 abuts against the abutment portion 5, it is possible that the first supported portions 2g are received in the first support portions 6 from the rear side. Accordingly, it is possible not to pay special attention in the location alignment in the operation of attaching the vehicle mount camera 2 to the bracket 3.

Also, since the elastic engagement pieces 7a are provided in the left and right second support portions 7, by the sliding operation of the vehicle mount camera 2 upwardly at the rear end portion 2d side around the first support portion 2g as a furculum from a state that the first supported portions 2g are received in the first support portions 6, it is possible to hold the camera to the bracket 3 in a state that wobbling of the vehicle mount camera 2 in the up-down direction is reduced as little as possible. Also, it is possible to hold the vehicle mount camera 2 to the bracket 3 in a state that wobbling of the vehicle mount camera 2 in the left-right direction is reduced as little as possible.

In the illustrated embodiment, the bracket 3 is an injection molded product wherein the base portion 4 integrally includes the abutment portion 5, the first support portions 6 and the second support portions 7. Also, the elastic engagement piece 7a is formed of a part of the second support portion 7. Accordingly, the bracket 3 is made of one piece, and it is possible to rationally provide the elastic deformation characteristics to the elastic engagement piece 7a.

Figure 7:
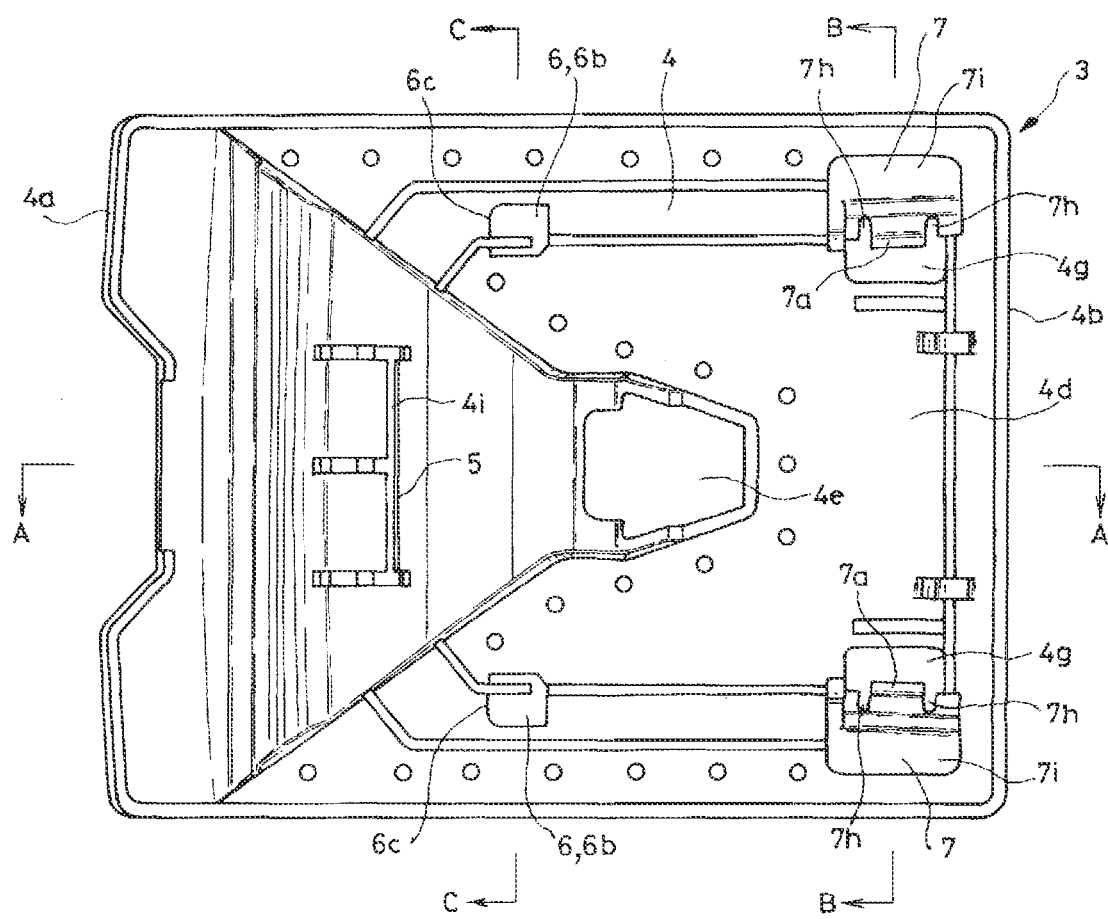
FIG. 7 is a bottom view of the bracket.
Figure 8:
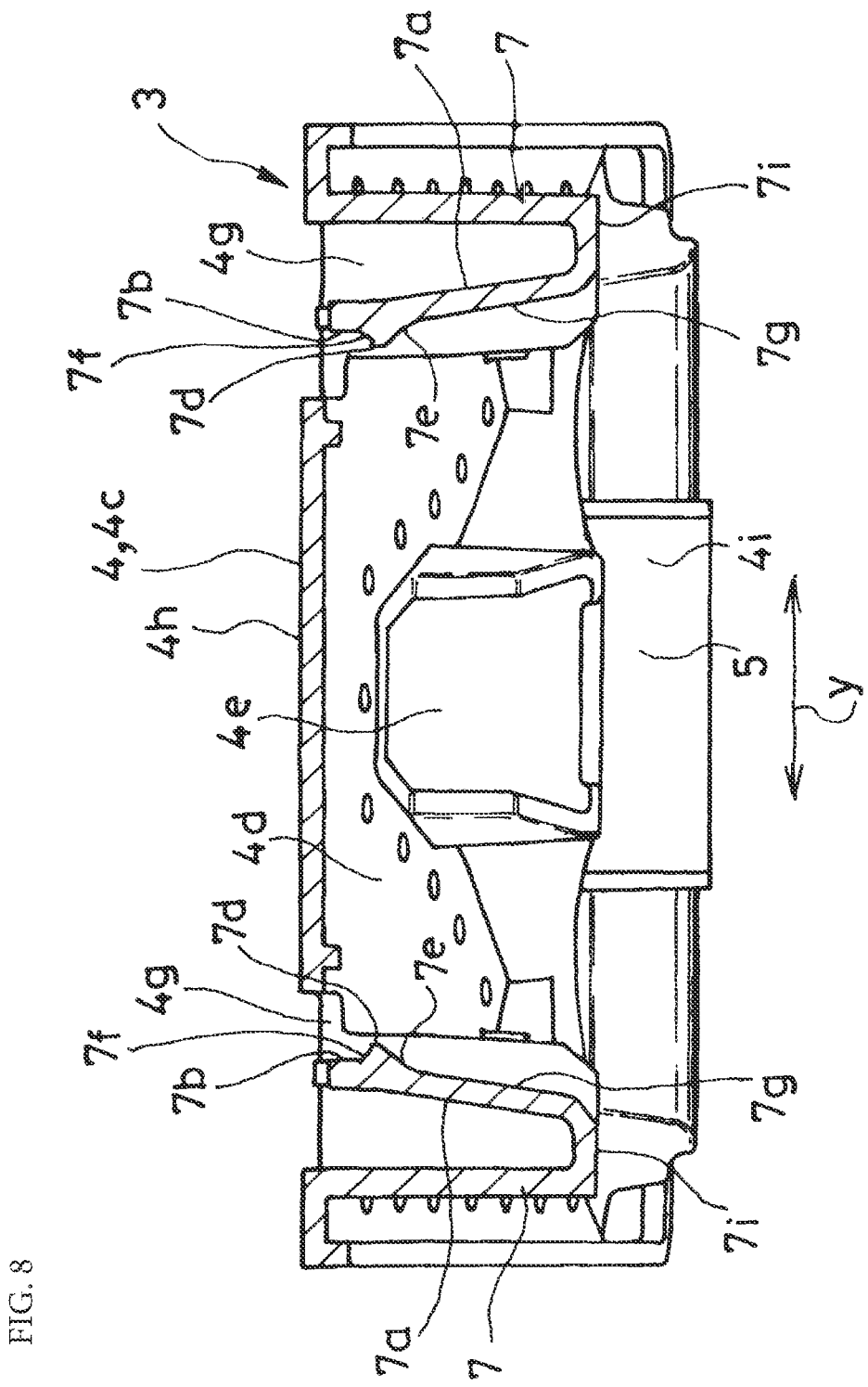
FIG. 8 is a cross-sectional view taken along a line B-B in FIG. 7.
Figure 9:
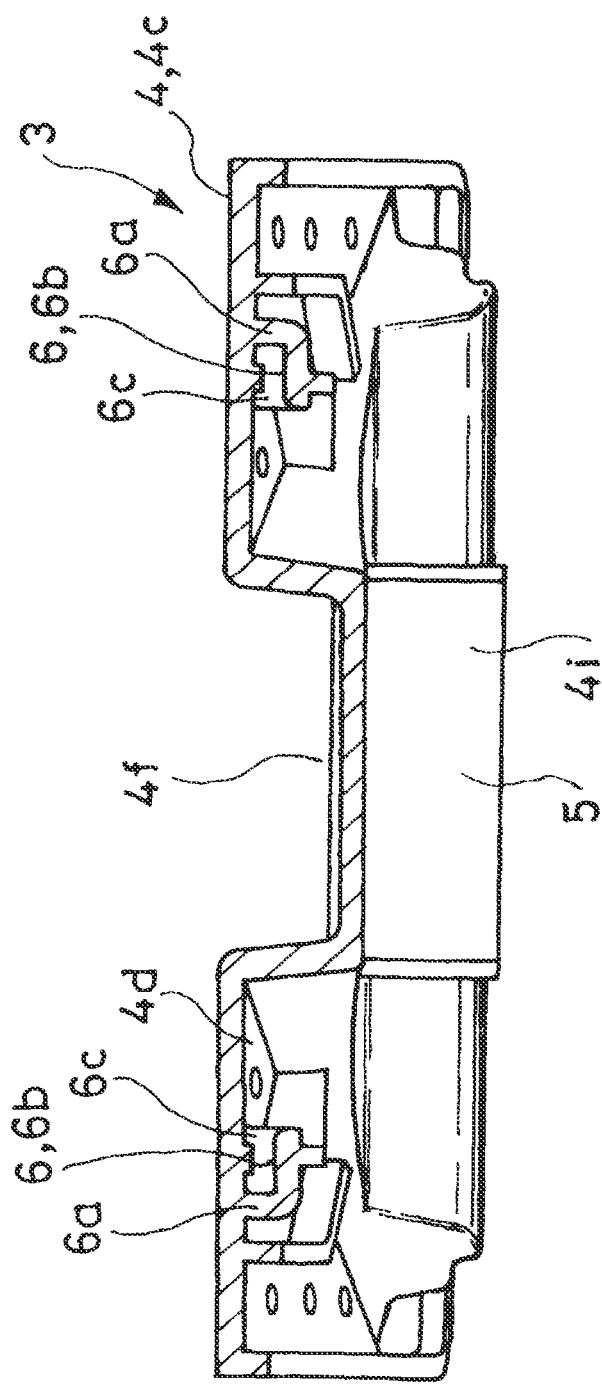
FIG. 9 is a cross-sectional view taken along a line C-C in FIG. 9.

The base portion 4 has a plate shape appearance having generally a rectangular outer line in a plane view (see FIG. 7). The vehicle mount camera 2 is designed to fit, at a lower face 4d side of the base portion 4, in a space surrounded by the abutment portion 5, the left and right first support portions 6, and the left and right second support portions 7. An open portion 4e is formed between a front end 4a and a rear end 4b of the base portion 4 such that a light receiving portion 2a is received from the rear side xb of the vehicle along the slide operation of the vehicle mount camera 2.

In the upper face 4c of the base portion 4, there is formed a light leading groove 4f at a portion between the front end 4a and the open portion 4e, gradually narrowing a groove width in the left-right direction z as approaching the open portion 4e.

Figure 1:
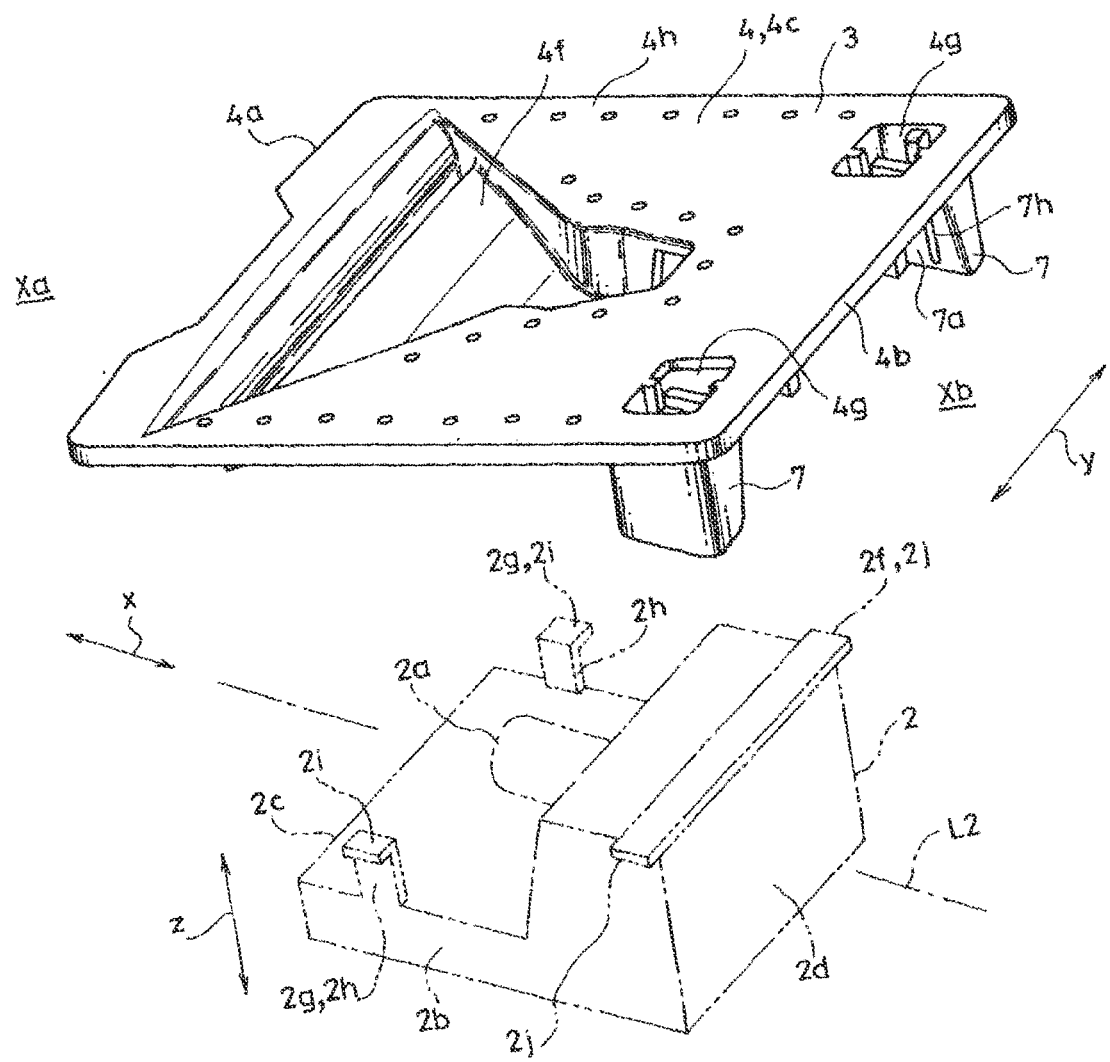
FIG. 1 is a perspective view of a bracket seen from an upper side according to an embodiment of the invention.
Figure 2:
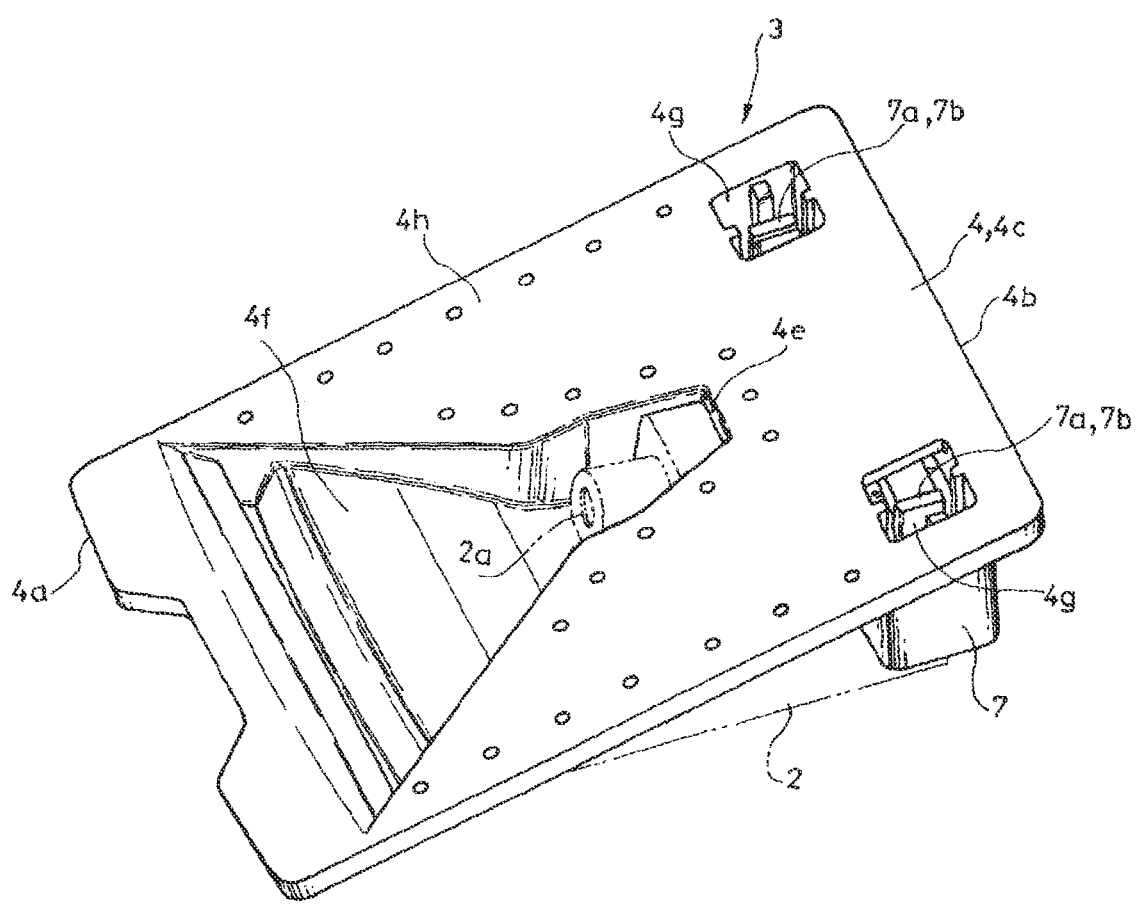
FIG. 2 is a perspective view of the bracket from the upper side, wherein a vehicle mount camera assembled with the bracket is indicated in an imaginary line.

Among the upper face 4c of the base portion 4, a portion except the light leading groove 4f and except immediately above the second support portions 7 indicated as numeral 4g in FIG. 1 is an attachment face 4h relative to the front window 1. In the illustrated embodiment, the bracket 3 is fixed to the front window 1 by adhesion using the attachment face 4h. The whole attachment face 4h is fixed to closely contact the inside face 1a of the front window 1, and has an inclination similar to the inclination of the front window 1.

Figure 6:
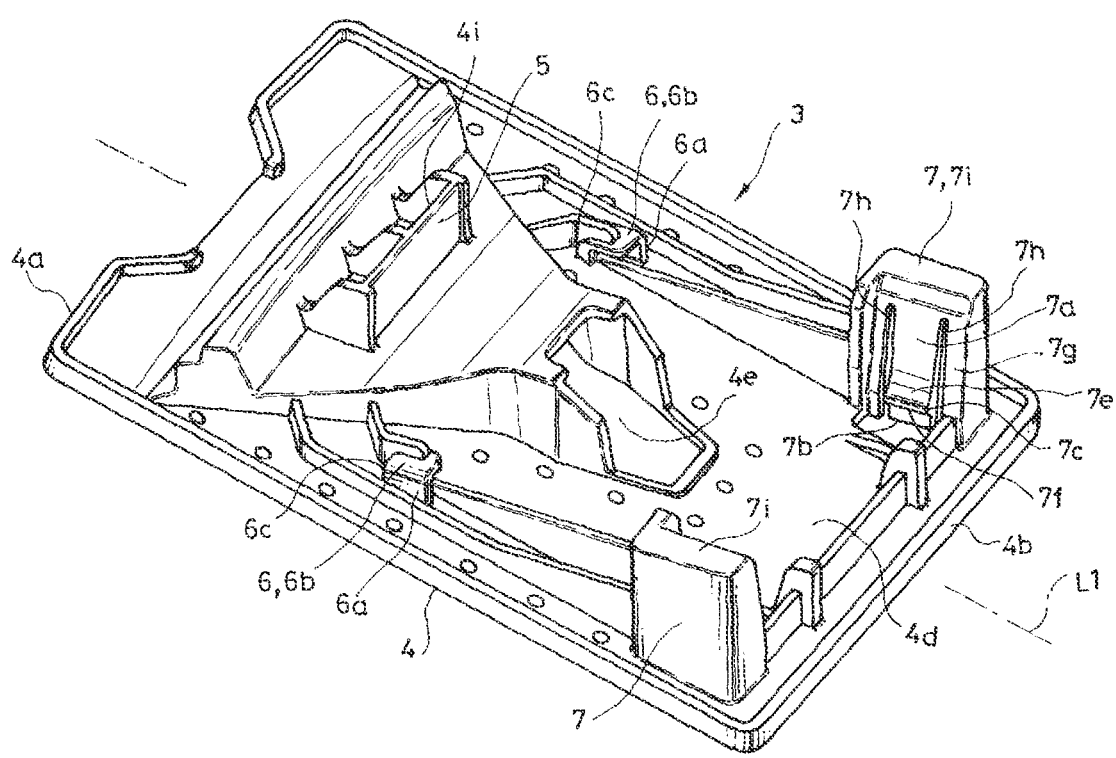
FIG. 6 is a perspective view showing the bracket from a lower side.

The abutment portion 5 is provided in the middle in the left-right direction z between the front end 4a and the open portion 4e of the base portion 4 (refer to FIG. 6). The abutment portion 5 is formed by a face directed to the rear side xb of the vehicle in a projection portion 4i projecting perpendicularly from the lower face 4d of the base portion 4. The projection portion 4i has a length along the left-right direction y of the vehicle.

The first support portions 6 are formed respectively, between the abutment portion 5 and the open portion 4e in the base portion 4, at the left and right sides with an imaginary center line L1 interposed therebetween, the imaginary center line L1 extending along the front-rear direction passing in the middle of the left-right direction y of the bracket 3 (see FIG. 6). Each of the left and right first support portions 6 includes a base portion 6a projecting perpendicularly from the lower face 4d of the base portion 4, and an engagement portion 6b projecting sideway to the center line L1 from a lower end of the base portion 6a. The base portion 6a shows a rib shape formed substantially parallel to the center line L1. The engagement portion 6b has a fin shape projecting sideway from the lower end of the base portion 6a. In the illustrated embodiment, the first support portion 6 further includes a closing portion 6c closing, at the front side xa of the vehicle, a space formed by the base portion 6a, the engagement portion 6b and the lower face 4d of the base portion 4.

The first engaged portions 2g of the vehicle mount camera 2 are formed between the front end portion 2c and the step 2e of the vehicle mount camera 2, each at left and right sides with an imaginary center line L2 interposed therebetween, the imaginary center line L2 extending along the front-rear direction passing in the middle of the left-right direction y of the vehicle mount camera 2 (see FIG. 1). The first engaged portion 2g includes a base portion 2h projecting from an upper surface of the vehicle mount camera 2, and an engaged portion 2i projecting in a direction opposite to the center line L2 from an upper end of the base portion 2h. In the illustrated embodiment, a distance between projection ends of the left and right engaged portions 2i is substantially the same as a distance between the base portions 6a in the left and right first support portions 6 of the bracket 3.

The second support portions 7 are respectively provided between the open portion 4e and the rear end 4b of the base 4, each being located at left and right relative to the center line L1 interposed therebetween (see FIG. 6). Each of the left and right second support portions 7 projects downwardly from a lower face of the base portion 4. In particular, the second support portion has a hollow rectangular column shape with a lower end closed. Inner faces 7g of the second support portions 7 facing the center line L1 incline to increase a distance in the left-right direction y between the second support portions 7 as it goes upwardly. Namely, the distance between the left and right second support portions 7 is wide at a lower side, and decreases as it goes upwardly (see FIG. 8).

The elastic engagement piece 7a is formed by a part of the inner face 7g of the second support portion 7 (see FIG. 6). In the illustrated embodiment, the second support portion 7 is open at the upper end, and the upper end opened communicates with the window hole 4g (see FIG. 8). The second support portion 7 is injection-molded through the window hole 4g. In the inner surface 7g of the second support portion 7, two cut grooves 7h extending from the lower end to the upper end of the second support portion 7 are formed with a space in the front and rear direction x. A portion between the two cut grooves 7h operates as the elastic engagement piece 7a. The two cut grooves 7h are open at the upper ends, and the elastic engagement piece 7a has a free end 7b at the upper end.

The elastic engagement piece 7a includes, in the engagement state, an engagement portion 7c regulating a rearward movement of the second supported portion 2j, and a free end portion 7b regulating a movement of the vehicle mount camera 2 in the left-right direction y pushed to the second supported portion 2j at the upper side of the engagement portion 7c (see FIG. 6). In particular, the engagement portion 7c is formed by a projection portion projecting to the center line L1 side at a lower side of the free end portion 7b of the elastic engagement piece 7a. The engagement portion 7c has an inclination face 7e reducing a distance with respect to the center line L1 as it goes to the top portion 7d from below the top portion 7d, and an engagement face 7f facing upward above the top portion 7d.

The second supported portions 2j of the vehicle mount camera 2 are formed, at a rear side of the step 2e of the vehicle mount camera 2, by a plate portion 2f long in the left-right direction y and formed at a corner contacting an upper face of the vehicle mount camera 2 with a rear face forming a part of the rear end portion 2d (see FIG. 1). The plate portion 2f is arranged such that a plate face faces sideward, and a size in the left-right direction y at a side of lower ends 7i of the left and right second support portions 7 is equal to or smaller that a distance between the elastic engagement pieces 7a of the support portions 7, and is greater, from the engagement portion 7c to the free end 7b, than the distance between the left and right elastic engagement pieces 7a of the support portions 7. Namely, the left and right ends of the plate portion 2f operate as the second supported portions 2j of the vehicle mount camera 2.

Accordingly, in the illustrated embodiment, in a state where the second supported portions 2j of the vehicle mount camera are located lower than the engagement portions 7c of the left and right second support portions 7, while the front end of the vehicle mount camera 2 is abutting against the abutment portion 5 of the bracket 3, the vehicle mount camera 2 can be operated to slide such that the engagement portions 2i of the first supported portions 2g enter between the corresponding engagement portions 6b of the left and right first support portions 6 of the bracket 3 and the lower face 4d of the base portion 4. From this condition, next, when the rear end portion 2d of the vehicle mount camera is moved upward around the first supported portions 2g as fulcrums, the elastic engagement pieces 7a elastically deform by contacting the second supported portions 2j with the engagement portions 7c of the elastic engagement pieces 7a of the second support portions 7, so that the upward movement of the rear end portion 2d side of the vehicle mount camera 2 is permitted until portions that the second supported portions 2j climb over the engagement portions 7c. The elastic deformations of the elastic engagement pieces 7a are made smooth because the second supported portions 2j slidably contact the inclination faces 7e of the engagement portions 7c. When the second supported portions 2j ride over the engagement portions 7c, the left and right elastic engagement pieces 7a elastically return to a direction to shorten the distance therebetween, and the engagement faces 7f of the engagement portions 7c are caught from below to the second supported portions 2j. Accordingly, the movement of the vehicle mount camera 2 downwardly is regulated. The distance between the free ends 7b of the left and right engagement pieces 7a is smaller than the distance between the left and right second supported portions 2j in a state that no elastic deformation occurs. Therefore, in a state that the second supported portions 2j are located above the engagement portions 7c of the second support portions 7, the free ends 7b push the second supported portions 2j in a state that the elastic engagement pieces 7a are elastically deformed. Namely, the rear end 2d of the vehicle mount camera 2 is sandwiched between the left and right second support portions 7 through the second supported portions 2j. Accordingly, the vehicle mount camera is held in the bracket such that the wobbling in the left-right direction y is minimized as little as possible.

Needless to say, the present invention is not limited to the above embodiment, and includes all the embodiments which can perform the objects of the invention.

EXPLANATION OF NUMERALS

2 Vehicle mount camera
2c Front end portion
2d Rear end portion
2g First supported portion
2j Second supported portion
5 Abutment portion
6 First support portion
7 Second support portion Incidentally, the specification, claims, drawings and abstract of Japanese Patent Application No. 2019-021177 filed on Feb. 8, 2019 are cited herein and incorporated as a disclosure of the specification of the invention.

What is claimed is:

1. A bracket for attaching to a window glass a vehicle mount camera for taking an image outside a vehicle through the window glass, comprising:
   a base portion configured to be fixed to an inside face of the window glass,
   an abutment portion on the base portion, for a front end portion of the vehicle mount camera,
   first support portions located at a rear side with respect to the abutment portion configured to receive a middle portion of the vehicle mount camera from a rear side,
   second support portions located at right and left of the base portion and at a rear side with respect to the first support portions, for receiving therebetween a rear end portion of the vehicle mount camera, the second support portions having inner faces facing each other and cut grooves formed in the inner faces to be spaced apart from each other with an open end, and
   elastic engagement pieces respectively provided in the inner faces of the left and right second support portions defined between the cut grooves, each engagement piece having a free end and integrally formed with each of the second support portions at a portion opposite to the free end, and an engagement portion with an engagement face projecting inwardly from the inner surface and configured to engage the vehicle mount camera, the elastic engagement piece permitting, by elastic deformation thereof, an upward movement operation of a rear portion of the vehicle mount camera at a front portion as fulcrum from a state that the first support portion receives the middle portion, and engaging at the engagement face the rear portion of the vehicle mount camera by elastic returning at a finish position of the upward movement operation.

2. A bracket according to claim 1, wherein each of the elastic engagement pieces includes the engagement portion regulating a downward movement of the second supported portion in an engagement condition, and the free end regulating a left and right movement of the vehicle mount camera by pushing the second portion at an upper side of the engagement portion.

3. A bracket according to claim 1, which is an injection molded product, wherein the base portion integrally includes the abutment portion, the first support portions and the second support portions.

4. A bracket according to claim 1, wherein each of the second support portions has a hollow rectangular column shape with a lower end closed, each engagement piece defined by the cut grooves being formed at an inner side of the hollow rectangular column shape.

5. A bracket according to claim 4, wherein each of the first support portions includes a base projecting from the base portion, and an engagement portion projecting inwardly to the base portion from a lower end of the base.

* * * * *